3,389,971
SPRAY-TYPE SOOT ELIMINATOR
Howard Alliger, 10 Ponderosa Drive,
Melville, N.Y. 11746
Continuation-in-part of application Ser. No. 594,844,
Nov. 16, 1966. This application June 14, 1967, Ser.
No. 645,948
6 Claims. (Cl. 23—277)

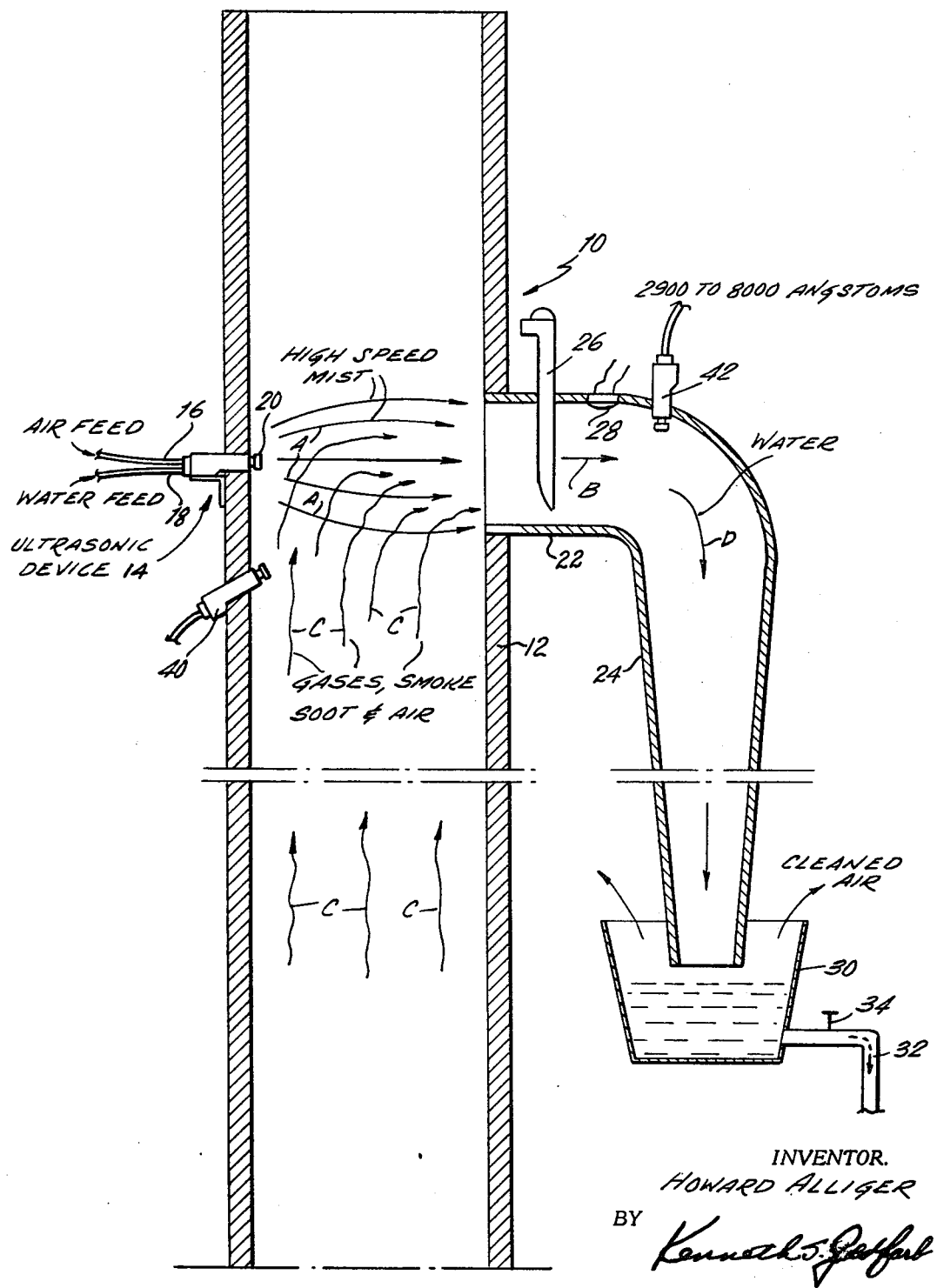

ABSTRACT OF THE DISCLOSURE

A soot eliminator for removing soot and noxious materials from combustion gases comprising means for delivering ultrasonic vibrations, a gas, a liquid, steam, ultraviolet light and other radiations into a chimney and into a disposal tube for absorbing and rendering more soluble in the liquid various noxious materials.

---

This invention relates to the air pollution reducing art, and more particularly to a spray-type soot eliminator, and is a continuation-in-part of the application of Howard Alliger, Ser. No. 594,844, filed Nov. 16, 1966, for Spray-Type Soot Eliminator.

Various types of gas scrubber and antipollution devices have been previously utilized in attempts to reduce air pollution arising from soot and noxious matter being disposed in the atmosphere from the combustion of various fuels or waste matter especially for industrial purposes. However, these prior art devices are usually quite complicated and expensive employing various delicate moving parts, swirls, huge amounts of water, packing wheels, filters, louvers, cyclones and other elements which generally required regular cleaning and frequent maintenance. Further, these devices did not serve to completely dispose of the soot and noxious material but merely screened part thereof from the atmosphere requiring other apparatus for disposal purposes.

It is therefore an object of the present invention to provide means for eliminating from combustion gases substantially all of the soot and noxious material such as sulfur dioxide while simultaneously providing a vehicle for the convenient and complete disposal thereof.

A further object of the invention is to provide a soot eliminator which has the advantages of using very little water, eliminates the need of a large chimney, uses no moving parts, uses no chemical addition, eliminates the need for sealing the system, and which will work with a wide range of combination velocities and volumes.

The present invention features the use of a spray which is directed across the path of the combustion gases rising up a chimney. A mist made up of very fine particles is used so that the combustion gases including the soot flow into the moving mist rather than bounce off. An application of ultrasonic energy causes the soot and noxious material to combine with the mist since the ultrasonic vibrations breaks down the surface tension of the liquid droplets and permits the furious combination of the noxious material and soot with the droplets. These droplets pass diametrically off the chimney and into a disposal tube or into a gross vertical spray for easy disposal to a sewer system.

In addition to the ultrasonic vibrations, radiation of both ultraviolet and light between 2900 and 8000 angstroms is applied on the noxious material laden mist. It has been found that application of ultraviolet light to the water-mist and combustion air combination produces ozone. The ozone, the $SO_2$ and $NO_2$ in the presence of moisture are combined so that the $SO_2$ and $NO_2$ are oxidized, and the product then becomes highly soluble. The light radiation serves to highly activate the $SO_2$ and $NO_2$ molecules.

These, together with the various ancillary objects and features which will become apparent as the following description proceeds are attained by this spray-type soot eliminator, a preferred embodiment being shown in the accompanying drawing, by way of example only, wherein:

The figure is a schematic vertical sectional view of the soot eliminator.

With continuing reference to the drawing as the following specification proceeds, reference numeral 10 generally designates a chimney having cylindrical walls 12 of a suitable refractory material. There is no need for a chimney of an extended height.

Mounted in the wall 12 is a spray nozzle generally indicated at 14. In operation, water is fed in through delivery conduit 16. The water is fed at a rate of between 0.1 and 3.5 lbs. per minute. Compressed gas such as compressed air or steam is fed through conduit 18 at a pressure ranging from 50 to 100 lbs. per square inch. The nozzle 14 is provided with an ultrasonic resonator or whistle 20 which provides for a minimum particle size and a fine mist spray. The particle size is in the order of 1 to 30 microns mean mass diameter and is directed in the direction of arrows A across the chimney 10 diametrically and into a delivery tube 22 extending horizontally and normally to the wall 12 of chimney 10. The delivery tube is diametrically opposed to nozzle 14 and is in horizontal alignment therewith so that the mist passes therethrough in the direction of arrow B.

The abatement of soot particles, especially in the difficult small micron range, can be enhanced by the use of steam.

Steam injected into the dirty gas stream carries the soot particles and wets them out as the steam hits a water spray or water fall, and condenses.

This action is enhanced by the addition of a sonic whistle or siren whose sound waves cause the soot particles to vibrate and combine completely with the condensing steam.

The steam may be injected by standard means or the steam itself may be used to actuate the sonic or ultrasonic whistle instead of air pressure.

The gases of combustion from a combustion chamber disposed a few feet below the nozzle 14 rise in the direction of arrow C. The application of the ultrasonic energy not only breaks up the liquid into a very small particle size but serves to cause the mixture of the soot and noxious materials with the liquid particles such as water or water vapor and thence such particles pass through delivery pipe 24 in the direction of arrow D into a waste pool, sump, or sewer pipe, or other suitable ultimate disposal means.

Mounted in the delivery tube 22 is an ultraviolet rod 26 providing a source of ultraviolet light. Radiation in the form of ultraviolet light produces ozone from the water-mist combustion products-air combination passing in the direction of the arrows B. The ozone will oxidize the sulphur dioxide ($SO_2$) and nitrogen dioxide ($NO_2$) to sulphuric acid ($H_2SO_4$) and nitric acid ($HNO_3$) respectively in the presence of the water vapor or mist; these acidic solutions are highly soluble and facilitate the removal and disposal of the soot and gases.

The $SO_2$ and $NO_2$ molecules are highly activated by the application of light waves between 2900 and 1800 angstroms. A lamp 28 is mounted in the tube 22 for delivering this radiation preferably between 3000 to 4000 angstroms. Steam is injected in two places, both just below the ultrasonic device 14 by nozzle 40 and through nozzle 42 downward. A highly unexpected result is an action similar to a catalytic action so that in the presence of the light waves and the ozone and water vapor, the $SO_2$ and $NO_2$ molecules quickly form with the ozone the soluble acid.

Disposed in pipe 24 and directed downwardly or gravity fed downwardly is a gross spray or waterfall, this latter spray is a stream of liquid adapted to catch the mist with entrapped soot, gases and acids to facilitate complete absorption and disposal. This is then fed into a collecting tank 30 which has an out at 32 controlled by valve 34. The combination of combustion gases and water spray forms a solution at about room temperature. Accordingly, the present invention is highly effective in removing noxious materials by rendering them more soluble in two ways when compared to prior art devices both by lowering the temperature where $SO_2$ itself is soluble and by the effect of the radiation. Further, there is no reduction in draft with the low temperature in the combustion.

While ultrasonics have been widely used before for air pollution abatement devices, such use has been only for agglomeration, and not in the manner and of the purpose of the present invention.

It will be obvious to those skilled in the art, upon studying this disclosure, that devices according to my invention can be modified in various respects and hence may be embodied in apparatus other than as particularly illustrated and described herein, without departing from the essential features of this invention and within the scope of the claims annexed hereto.

I claim:

1. A soot eliminator for removing soot and noxious material from combustion gases comprising a chimney for receiving combustion gases from a combustion chamber and for permitting said combustion gases to rise upwardly thereof, a disposal tube mounted in said chimney and extending normal thereto, fluid disposal means depending from and connected to said disposal tube, and spray nozzle means mounted in said chimney spaced from and in alignment with said disposal tube and including means for simultaneously delivering a gas, a liquid, and ultrasonic vibrations into said chimney and across the upward path of said combustion gases and into said disposal tube for separating soot and noxious material from said combustion gases and for directing said soot and noxious material into said disposal tube, a source of ultraviolet disposed in said disposal tube, and a light source for introducing radiation of between 2900 to 8000 angstroms disposed in said disposal tube.

2. A soot eliminator according to claim 1, wherein said spray means is mounted perpendicular to combustion gas flow and said chimney.

3. A soot eliminator according to claim 2, wherein said spray nozzle means including means for delivering fine droplets of water of a size in the order of 1 to 30 microns.

4. A soot eliminator according to claim 3, wherein said spray nozzle means including means for delivering compressed air, said light source introducing radiation of between 3000 to 4000 angstroms.

5. A soot eliminator according to claim 1, wherein said spray nozzle means includes means for delivering saturated steam.

6. A soot eliminator according to claim 1, wherein said spray nozzle means including means for delivering said gas and said liquid in a fine mist which are combined with said soot and noxious material by said ultrasonic vibrations.

References Cited

UNITED STATES PATENTS

| 771,406 | 10/1904 | Willett | 261—17 X |
| 967,135 | 8/1910 | Lachance. | |
| 1,269,724 | 6/1918 | Martin | 261—17 |
| 2,045,519 | 6/1936 | Coutant. | |
| 2,300,761 | 11/1942 | Amy | 55—277 X |
| 2,935,375 | 5/1960 | Boucher. | |
| 3,094,400 | 6/1963 | Blanton | 55—279 X |
| 3,126,003 | 3/1964 | Steel | 250—43 X |

FOREIGN PATENTS

| 1,063,578 | 8/1959 | Germany. |

RONALD R. WEAVER, *Primary Examiner.*